United States Patent [19]

Willinger

[11] 4,185,743

[45] Jan. 29, 1980

[54] ARTIFICIAL AQUARIUM PLANT, ANCHOR AND CONTAINER THEREFOR

[75] Inventor: Allan H. Willinger, New York, N.Y.

[73] Assignee: Willinger Bros., Inc., New York, N.Y.

[21] Appl. No.: 910,466

[22] Filed: May 30, 1978

[51] Int. Cl.² .............................................. B65D 85/54
[52] U.S. Cl. ..................................... 206/423; 52/166; 248/27.8; 248/530; 428/20
[58] Field of Search ..................... 206/423; 428/17, 19, 428/20, 23; 248/27.8, 519, 530; 52/155, 165, 166

[56] References Cited

U.S. PATENT DOCUMENTS

| | | | |
|---|---|---|---|
| 1,086,640 | 2/1914 | Blackburn | 52/166 |
| 1,967,391 | 7/1934 | Blackburn | 52/166 |
| 3,002,308 | 10/1961 | Decamp | 206/423 |
| 3,083,824 | 4/1963 | Ness | 206/423 |
| 3,671,367 | 6/1970 | Chin | 206/423 |
| 3,682,753 | 8/1972 | Willinger | 428/19 |

Primary Examiner—Donald F. Norton
Attorney, Agent, or Firm—Friedman, Goodman & Teitelbaum

[57] ABSTRACT

An artificial aquarium plant which includes an anchor in the shape of a narrow, elongated trough having a generally V-shaped cross section. The ends of the anchor are diverging downwardly to form scoops at the opposing ends. Transverse connecting walls define storage cells therebetween to receive the anchoring material, such as sand, for retaining the anchor at the bottom of an aquarium tank. A hollow tubular post provided in the anchor includes a restraining shoulder in its hollow portion. The plant member includes a bifurcated stem which can be inserted into the hollow post, and a ledge or lip section on the stem which engages the restraining shoulder to prevent removal of the plant member from the anchor. A package is designed to retain the artificial aquarium plant where the anchor acts in such a manner as to avoid crushing of the plant member.

24 Claims, 10 Drawing Figures

ARTIFICIAL AQUARIUM PLANT, ANCHOR AND CONTAINER THEREFOR

BACKGROUND OF THE INVENTION

This invention relates to artificial aquarium plants, and more particularly to a plant having an improved anchor as well as an improved coupling between the plant member and the anchor.

Aquariums are finding increased use both professionally and by hobbyists. One of the features of an aquarium is to provide its beautification and decoration by means of plants. In order to avoid the need for sunlight and to avoid continuous contamination and cleaning, artificial plants are being utilized to simulate the appearance of natural plants. The simulated plants are anchored on a base member and generally positioned at the bottom of the tank where they are retained by weighted material. Some base members are themselves formed of heavy material to remain at the bottom of the tank. However, these are generally expensive, and awkward to manipulate and position in the tank.

The more popular types of simulated plants include a base member which is positioned at the bottom of the tank and utilizes the existing sand or gravel customarily used at the bottom of an aquarium as the anchoring material for the artificial plant.

Generally, the artificial aquarium plant includes a plant member which is coupled to the anchor. The coupling arrangement must be such as to facilitate assembly while yet remaining permanent once connected. Furthermore, it must also be of a type which cannot be easily separated by the movement of the fish or the water once positioned in the aquarium.

One such artificial aquarium plant is described in U.S. Pat. No. 3,682,753 issued to the present inventor. In that patent, there is described a plant having a base member, and a simulated plant member connected to the base member. The base member includes an oval shaped base wall having a peripheral wall upwardly extending therefrom so as to form a dish-like container which can retain the sand or gravel and remain anchored at the bottom of the tank. The plant member is connected to the base member by means of a plug and socket arrangement with a hollow portion formed in the stem of the plant member which is retained in a hole formed in the base member. A plug is press fitted through the bottom of the base member into the hollow stem to retain the stem tightly wedged in the hole in the base member.

While the above described artificial aquarium plant provides an extremely useful device, there is still a need for providing an artificial aquarium plant which can be more easily installed in the aquarium. The aforementioned artificial plant must be positioned at the bottom of the aquarium and then sand or gravel filled into the oval dish. This frequently can disturb adjacent plants already secured in the bottom of the aquarium. Furthermore, while the coupling arrangement is easy to assemble, when pulling on the plant member while the base member is held at the bottom of the aquarium, the two parts could separate. Additionally, although the oval shape permits a compact arrangement by utilizing the uniqueness of the oval shape, the wide space at the major and minor axes of the oval require a separation between adjacent artificial plants which may prevent as dense an arrangement of plant life as is desired.

SUMMARY OF THE INVENTION

Accordingly, it is an object of the present invention to provide an improved artificial aquarium plant useful as simulating plant life.

Another object of the present invention is to provide an artificial aquarium plant which includes an improved anchor.

Still another object of the present invention is to provide an improved artificial aquarium plant which includes an improved coupling arrangement between the plant member and the anchor member.

Yet a further object of the present invention is to provide an artificial aquarium plant which includes a unique packaging arrangement therefor.

Another object of the present invention is to provide an attractive, yet inexpensive artificial aquarium plant.

Still another object of the present invention is to provide an improved anchor for an artificial aquarium plant.

A further object of the present invention is to provide an anchor for an artificial aquarium plant which can be easily installed beneath the gravel or sand at the bottom of an aquarium while preventing disturbance of adjacent plants.

Yet a further object of the present invention is to provide an improved artificial aquarium plant which will not float from its anchor even when moved or dislodged by natural aquarium inhabitants or by a fish net which tends to get caught in the foliage while netting a fish or by the jet stream of water emanating from certain types of aquarium filters.

Still a further object of the present invention is to provide an anchor for an artificial aquarium plant which can be connected to, and which will retain, a plant member permitting simple assembly and preventing separation.

In accordance with the features of the present invention the above objects are accomplished by providing an artificial aquarium plant comprising an anchor and a plant member. The anchor includes a base member which receives material to provide anchorage for the plant member. The plant member includes a bifurcated stem portion having a ledge or lip section formed about the bifurcated end. The base member is provided with a hollow tubular post for receiving the bifurcated end and includes a restraining shoulder formed in the hollow portion for engaging the ledge section to thereby prevent removal of the plant member from the anchor.

The anchor of the present invention is formed as a narrow, elongated trough shaped member of generally V-shaped cross section. The ends of the anchor are diverging downwardly to define scoops at the opposing ends. A plurality of longitudinally spaced apart connecting walls transversely cross the anchor to define therebetween storage cells which receive the material for anchoring the member at the bottom of the aquarium.

In order to provide the interconnection between the plant member and the anchor, the hollow tubular post is vertically oriented and is formed with a two diameter bore having the smaller diameter bore positioned vertically above the larger diameter bore. The radial interface between the two bores defines the restraining shoulder which prevents the upper movement of the stem of the plant member. The stem itself comprises a cylindrical shaft with an enlarged conical head. The radial interface therebetween forms the ledge section which engages the restraining shoulder in the post.

The artificial aquarium plant is packaged in an elongated container whose length is sufficient to hold the plant member and whose width is approximately the same size as the length of the anchor. In this manner the rigid anchor retains the shape of the package to prevent crushing of the plant member.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings like reference characters designate like parts.

DETAILED DESCRIPTION OF THE PREFERRED EMBODIMENT

Figure 1:
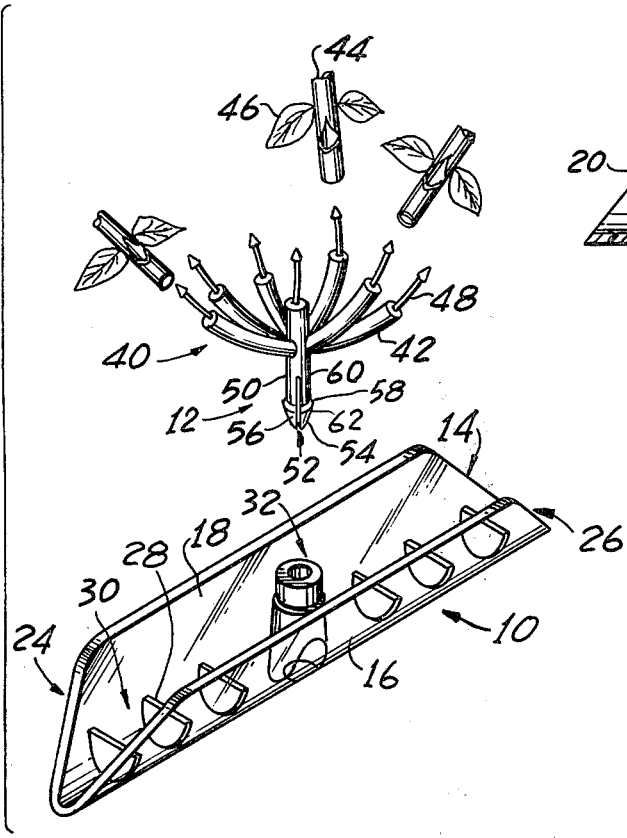
FIG. 1 is an exploded view of the artificial aquarium plant in accordance with the present invention.
Figure 2:
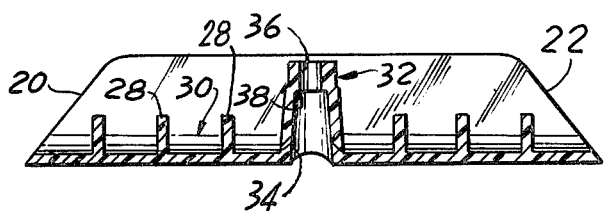
FIG. 2 is an elevated sectional view of the anchor.
Figure 3:
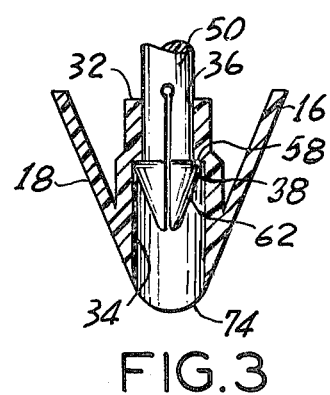
FIG. 3 is an enlarged end sectional view taken through the center of the artificial aquarium plant and showing the coupling arrangement between the plant member and the anchor.

Referring now to FIGS. 1-3, the artificial aquarium plant of the present invention comprises an anchor 10 and a plant portion 12. The anchor includes a narrow elongated base member formed as a substantially V-shaped trough 14 having side walls 16 and 18. The ends of the base member 14 are diverging downwardly with respect to the vertical center of the base member to form the guide edges 20 and 22 defining forward are rear scoops 24, 26. Inside the trough shaped base member are a plurality of connecting walls 28 which are longitudinally spaced apart from each other and transversely cross the base member to interconnect the side walls 16, 18. The height of the connecting walls are less than the height of the base member itself. The connecting walls 28 define therebetween storage cells 30.

Positioned substantially at the center of the base member, being approximately equally spaced between the opposing ends, is a hollow tubular post 32. The hollow portion is formed by a stepped bore arrangement of different diameters with the larger diameter bore 34 being positioned beneath the smaller diameter bore 36. The radial interface therebetween forms a restraining shoulder 38 for holding the plant portion therein, as will hereinafter be explained. The upper end of the post 32 is disposed slightly below and between the upper edges of the sidewalls 16, 18.

The plant portion includes a lower trunk 40 having a plurality of branches 42 to which can be connected additional sections 44 containing foliage 46 to thereby provide a simulated plant of the desired type. By utilizing detachable sections which readily fit into each other, the appearance of the desired plant may be easily achieved by connecting sections together by means of the pin arrangement 48 to achieve the height, width, and type of the plant to be simulated.

At the bottom of the trunk 40 is a stem 50 which is bifurcated at 52 forming side sections 54 and 56. The bifurcated stem 50 includes a radial ledge or lip 58 which is formed at the interface between cylindrical shaft 60 and a larger conical head 62.

The plant portion 12 is formed separately from the anchor. In this way, a common anchor can be utilized for numerous types of plant portions and the plant portions can be formulated of a size, shape, and type as desired. Once the plant portion is assembled, the trunk thereof can be coupled to the anchor. The coupling, as can best be seen in FIG. 3, is achieved by inserting the bifurcated stem 50 into the hollow tubular post 32. The base of the conical head 62 is of a size which proximates the diameter of the larger bore 34. However, because of the bifurcation, the sections 54, 56 of the conical end can be compressed to permit insertion of the conical end through the small diameter bore 36 by means of slight pressure. However, once inserted past the shoulder 38, the ledge 58 engages the shoulder to prevent the plant from being pulled out of the anchor.

In this manner, the plant can be easily assembled to its anchor and, at the same time, once assembled will provide a secure connection to prevent removal of the plant from its anchor.

Once assembled, the artificial plant can be positioned in the aquarium. The positioning is achieved by lowering the plant to the bottom of the tank and placing it at the desired position over the sand or gravel. Once positioned on the sand or gravel, the artificial plant anchor need only be slightly moved in a forward and reverse longitudinal direction to secure it in the aquarium.

Figure 4:
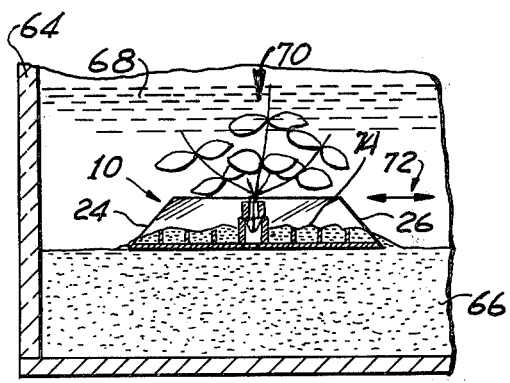
FIG. 4 is an elevated partial sectional view of an aquarium showing the positioning of the artificial aquarium plant in the aquarium.
Figure 5:
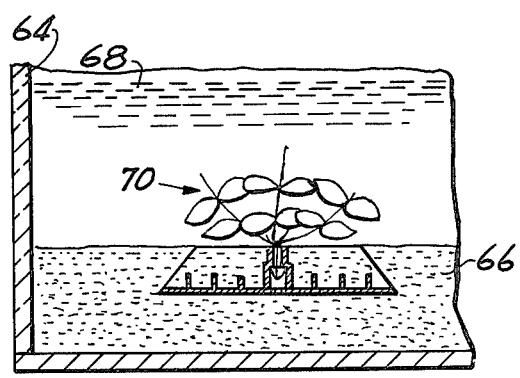
FIG. 5 is an elevated partial sectional view of the aquarium and artificial plant with the plant positioned in the aquarium.

As can best be seen in FIGS. 4 and 5, there is shown an aquarium including a vertical wall 64, sand or gravel 66 at the bottom of the tank and water 68 within the tank. The artificial aquarium plant 70 of the present invention is initially lowered so that the anchor 10 is placed at the desired position on the sand or gravel 66. The anchor is then longitudinally moved slightly forward and back as shown by the arrow 72. By such movement, the scoops 24 and 26 will pick up some of the sand or gravel and move it into the storage cells 30, as shown by the sand 74 accumulating over the retaining walls 28 and moving into the storage cells. With continued forward and reverse movement, the sand will move from one storage cell to the next until all of the cells are filled. The anchor will then be positioned beneath the sand or gravel, as shown in FIG. 5. The plant 70 will then be retained in the water in an upright position and held securely by means of the anchor.

It will be appreciated that because of the scooping or funneling action of the ends of the anchor, there is a filling of the anchor with sand or gravel with just a slight movement thereof, for example $\frac{1}{8}''$ in either direction, therefore there is no need to disturb adjacent plants already securely positioned in the aquarium. Certain fish, such as large catfish, that normally dig into the sand or gravel, or the use of a fish net by the hobbyist, or a jet stream of water emanating from certain types of aquarium filters, each can lift the anchor from the sand or gravel. However, even after such movement, the anchor of the present invention will still remain positioned on the surface of the sand or gravel, as shown for example in FIG. 4, because of the sand or gravel trapped in the plurality of storage cells.

In all cases of prior art devices using non-weighted anchors, the gravel spills out and the plant floats to the surface because the material used for the plant foliage is low density polyethylene which has a specific gravity less than water. The sand or gravel in the storage cells of the present invention provides sufficient weight so that even if the anchor is dislodged from the aquarium sand, the storage cells retains the gravel therein. In fact, it requires almost a 180° upside-down turn of the anchor to dislodge the sand or gravel trapped in the storage cells. With prior art devices, only a few degrees of angularity "pours" the sand or gravel out of the prior art anchor. Since the present anchor is preferably crystal clear plastic, it is unobstrusive even while resting on the gravel or sand bed, rather than in its preferred buried position.

Figure 7:
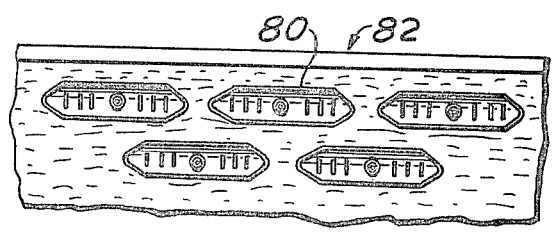
FIGS. 6 through 8 are partial top plan views of an aquarium illustrating various arrangements for placing the plurality of plants in an aquarium in order to achieve a dense plant arrangement.
Figure 6:
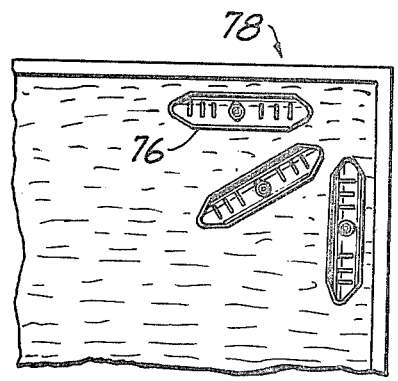
Figure 8:
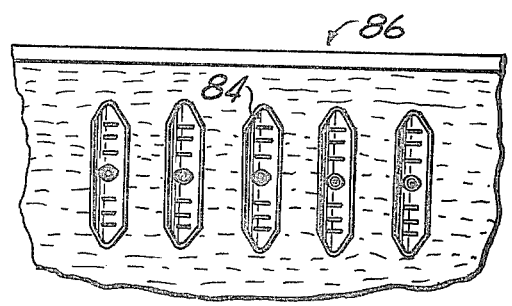

Because of the unique shape of the anchor, it is possible to provide an extremely dense packing arrangement for artificial plants in an aquarium. As shown by way of illustration in FIGS. 6–8, a number of packing arrangements can be achieved, where only the anchors are shown for a clearer understanding thereof. For example, the arrangement of FIG. 6 shows a series of radially arranged artificial plant anchors 76 positioned within the aquarium tank 78. FIG. 7 shows a longitudinal staggered arrangement of the plant anchors 80 in the tank 82; while FIG. 8 shows a parallel spaced arrangement of the plant anchors 84 within the tank 86. It should be appreciated, that the dense packing arrangement can be achieved because of the extremely narrow shape of the anchor which permits close spacing of plants adjacent to each other. At the same time, because of the trough shaped arrangement with the scoops at the forward and rear ends, the plants can be positioned extremely close to each other without disturbing those that have previously been placed at their desired location in the aquarium.

Typically, the anchor will be formed of a clear, rigid thermoplastic material. By way of example, polystyrene has been efficiently utilized for the formation of such anchors. This permits easy molding of the anchors and provides a clear transparent appearance so that even if a portion of the anchor is dislodged and located above the sand, it will not mar the beauty and will be noticed. The plant portion is typically of a resilient, flexible plastic material which can also be formed into various shapes and interconnected to each other to form an integral plant of desired size, shape and appearance. Also, the specific gravity of the material utilized in the construction of the aquarium plant should beneficially be less than that of water to thereby enable the artificial plant to give the appearance of undulating or swaying thereby enhancing its attractiveness and natural appearance.

In packaging the artificial plant of the present invention, there is an undesired tendency for the plant portion to be easily crushed, bent or squashed so that it might lose its attractiveness. The packaging typically is done in a plastic container which does not provide rigid support or protection for the plant. To manufacture the container of a more rigid material would increase its cost. However, by forming the shape and size of the container to utilize the rigid nature of the anchor, it is possible to package the artificial aquarium plant in a manner to self-retain its shape within the package.

Specifically, the container can be formed of a length sufficient to accommodate the height of the plant portion. The width of the package should be such as to be only slightly larger than the longitudinal length of the anchor member. In this way, the anchor will substantially fill the width of the container and retain the container in its wide shape so that it will keep its spaced apart relationship and avoid crushing of the plant portion.

Figure 9:
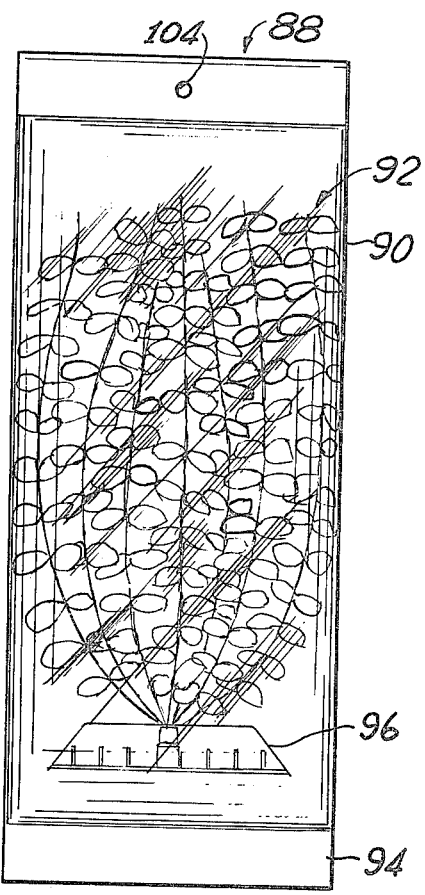
FIG. 9 is an elevational view of the artificial plant packaged in a container.
Figure 10:
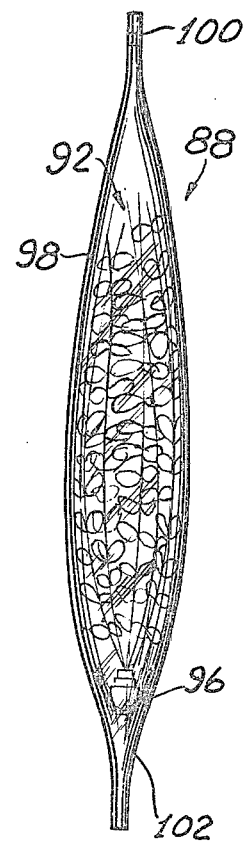
FIG. 10 is a side view of the packaging arrangement shown in FIG. 9.

As can best be seen in FIGS. 9 and 10, the package 88 is formed of a plastic material and is of substantially rectangular shape. The length of the package along its side 90 is sufficient to accommodate the height 92 of the plant portion. The width along its edge 94 is such as to be only slightly larger than the longitudinal length of the anchor portioh 96. In this way, the anchor 96, which is rigid, retains the width of the container in spaced apart relation to prevent its being crushed and thereby keeping the plant portion 92 from being damaged.

Typically, the container is formed of a transparent flexible sheet material which is folded over and connected along a seam 98 to provide a substantially flat package. The top end 100 is heat sealed and the artificial plant inserted with the formed tubular container. The lower end 102 is then heat sealed to retain the artificial plant within the package. A hole 104 can be formed in the top to permit hanging of the package for display purposes. By making the package out of clear transparent material it is possible to view the size, shape, and appearance of the plant in order to permit easy selection of the type and size of plant desired for use in the aquarium.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An anchor for an artificial aquarium plant, comprising:
a narrow, elongated, trough-shaped base member generally V-shaped in cross section, having open ends for defining a forward and rearward entrance way, said ends diverging downwardly to define scoops at said entrance ways, and coupling means on said base member for securely retaining an artificial aquarium plant.

2. An anchor as in claim 1 and further comprising a plurality of longitudinally spaced apart connecting walls transversely crossing said base member for defining therebetween storage cells for receiving material to provide anchorage for said base member.

3. An anchor as in claim 2, wherein said connecting walls are shorter than the height of the base member.

4. An anchor as in claim 1, wherein said coupling means comprises a hollow tubular post provided in said base member for receiving the stem portion of an artificial aquarium plant, and a restraining shoulder provided in said hollow portion for preventing removal of the stem portion therefrom.

5. An anchor as in claim 4, wherein said hollow tubular post is vertically oriented and is provided with a two diameter bore having the smaller diameter of said bore, positioned vertically above the larger diameter of said bore, the radial interface between said two diameters of said bore defining said restraining shoulder for preventing upward removal of the stem portion.

6. An anchor as in claim 5, wherein said hollow tubular post is centrally disposed and spaced from said ends.

7. An anchor as in claim 4 and further comprising a plant member having a stem portion insertable in said tubular post, said stem portion having a bifurcated end to facilitate insertion of the stem portion into said hollow tubular post, and a ledge section provided about the bifurcated end for engaging said restraining shoulder to prevent removal of the plant member from the anchor.

8. An anchor as in claim 6, wherein said stem portion comprises a cylindrical shaft with an enlarged conical head, the radial interface therebetween providing said ledge section.

9. An anchor as in claim 1, wherein said base member is formed of a clear, rigid, thermoplastic material.

10. An anchor as in claim 9, wherein said material is polystyrene.

11. An artificial aquarium plant comprising, an anchor and a plant member, said anchor comprising a base member for receiving materials to provide anchorage for said plant member, said plant member including a bifurcated stem portion having a ledge section formed about said bifurcated end, said base member being provided with a hollow tubular post for receiving said bifurcated end, and a restraining shoulder provided in said hollow post for engaging said ledge section to prevent removal of the plant member from the anchor.

12. An artificial aquarium plant as in claim 11, wherein said hollow tubular post is vertically oriented and is formed with a two diameter bore having a smaller diameter bore portion positioned vertically above a larger diameter bore portion, the radial interface between said two bore portions defining the restraining shoulder for preventing upward movement of the stem portion inserted therein.

13. An artificial aquarium plant as in claim 11, wherein said stem portion comprises a cylindrical shaft and an enlarged conical head, the radial interface therebetween providing said ledge section.

14. An artificial aquarium plant as in claim 11, wherein said base member is an elongated, trough-shaped member of generally V-shape in cross section, and having open ends for defining a forward and rearward scoop.

15. An artificial aquarium plant as in claim 14, wherein said ends are downwardly diverging.

16. An artificial aquarium plant as in claim 11 and further comprising a plurality of longitudinally spaced apart connecting walls transversely crossing said base member for defining therebetween storage cells for receiving material to provide anchorage for said base member.

17. An artificial aquarium plant as in claim 16, wherein said connecting walls are shorter than the height of the base member.

18. An artificial aquarium plant as in claim 11, wherein said anchor is formed of clear, rigid, thermoplastic material, and said plant member is of a flexible and resilient material.

19. In combination, an artificial aquarium plant and a package therefor, said artificial aquarium plant comprising a narrow elongated anchor, a plant member simulating a natural plant, and coupling means for centrally connecting said plant member to said anchor in a T-connection; the package comprising an elongated container for holding said artificial aquarium plant, the length of said container being sufficient to retain said plant member, and the width being slightly larger than the length of said anchor, whereby said anchor retains the shape of the package to prevent crushing of said plant member.

20. The combination as in claim 19, wherein said container is of a flat rectangular shape.

21. The combination as in claim 19, wherein at least part of said container is of a clear plastic material to permit viewing of the plant member contained therein.

22. The combination as in claim 19, wherein said plant member is of flexible, resilient material and comprising a stem portion coupled to said anchor and a plurality of branches with foilage thereon spreading from said stem portion to substantially fill the container.

23. The combination as in claim 19, wherein said anchor is a trough-shaped configuration of generally V-shape in cross section and having slanted open ends for defining a forward and rearward scoop.

24. The combination as in claim 23 and further comprising a plurality of longitudinally spaced apart connecting walls transversely crossing said base member for defining therebetween storage cells for receiving materials to provide anchorage for said base member.

* * * * *